(12) United States Patent
Wu et al.

(10) Patent No.: US 6,539,139 B2
(45) Date of Patent: Mar. 25, 2003

(54) OPTICAL FIBER SWITCHING DEVICE

(75) Inventors: Caleb Wu, Kaohsiung Hsien (TW); Wen-Pin Yang, Ping-Tung Hsien (TW)

(73) Assignee: Technology Thesaurus Corporation, Kaohsiung (TW)

( * ) Notice: Subject to any disclaimer, the term of this patent is extended or adjusted under 35 U.S.C. 154(b) by 0 days.

(21) Appl. No.: 09/832,949

(22) Filed: Apr. 12, 2001

(65) Prior Publication Data

US 2002/0150322 A1 Oct. 17, 2002

(51) Int. Cl.[7] .................................................. G02B 6/26
(52) U.S. Cl. .......................................... 385/16; 385/19
(58) Field of Search ...................................... 385/16, 19

(56) References Cited

U.S. PATENT DOCUMENTS 4,378,144 A * 3/1983 Duck et al. .................... 385/16
5,926,588 A * 7/1999 Murakami et al. ............. 385/16
6,055,877 A * 5/2000 Welterlin et al. ............. 248/429

* cited by examiner

*Primary Examiner*—Robert H. Kim
*Assistant Examiner*—Richard Kim
(74) *Attorney, Agent, or Firm*—Bacon & Thomas (57) ABSTRACT

An optical fiber switching device includes a holding base, a threaded axle and two guide spindles installed in the holding base, a motor connected with the threaded axle to drive the threaded axle to rotate, and a positioning block meshed with the threaded axle and supported by the two guide spindles. When the motor is actuated, the positioning block is linearly moved along the threaded axle and kept in balance, thus a first collimating lens disposed on the positioning block is able to be precisely aligned with a second collimating lens which is disposed at a side of the holding base. Because the first collimating lens and the second collimating lens are precisely in alignment, any possible insertion loss of the optical fiber switching device is minimized.

8 Claims, 8 Drawing Sheets

OPTICAL FIBER SWITCHING DEVICE

BACKGROUND OF THE INVENTION

1. Field of the Invention

The present invention relates to an optical fiber switching device, and more particularly to an optical fiber switching device that relies upon linear motion to change switching positions, and precisely align light output side with light input side so as to enhance the accuracy of the optical fiber checking.

2. Description of Related Art

Optical fibers are widely and popularly applied to be a medium of data transmission, because the data transmission speed of the optical fiber is extremely fast, moreover the bandwidth of the optical fibers is much broader than conventional cables and telephone lines. Thus, the optical fibers are often applied to transmit a great quantity of data, such as video signals and voice signals, to immediately transmit data. When an optical fiber network has been set up, an important procedure is to check whether the optical fiber has been damaged.

For the purpose of checking the optical fiber, an optical switch is disclosed in U.S Pat. No. 4,378,144 ('144) by Duck, et al.

Figure 8:
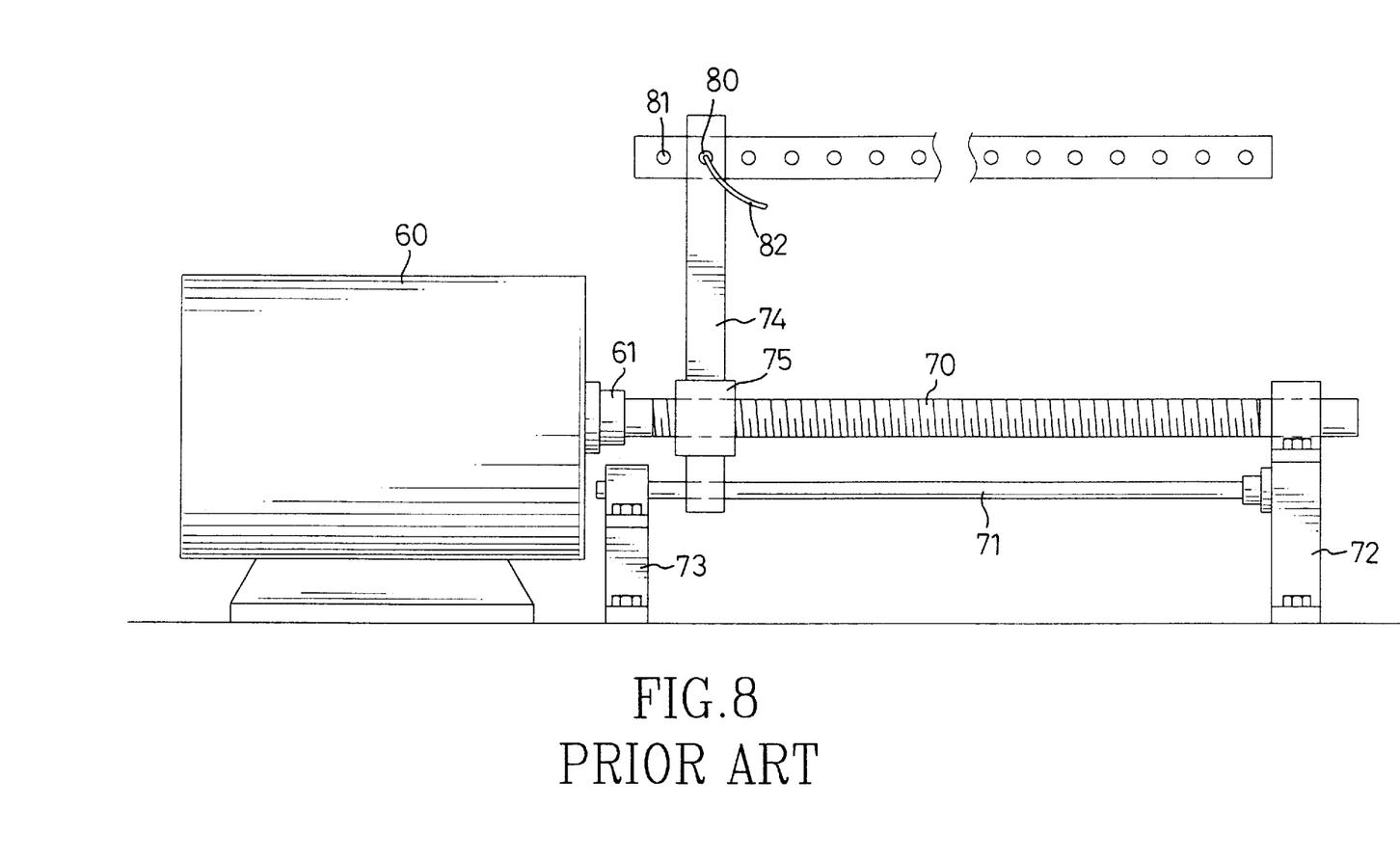
FIG. 8 is a side plan view of a conventional optical switch.

With reference to FIG. 8, the optical switch in the '144 patent comprises a motor (60) having a threaded axial extension (70) attached to its shaft (61) with a nut (75) received upon the threaded axial extension (70). The nut (75) has a short lower arm and a long upper arm (74). A guide spindle (71) supported at two ends thereof by a first pillar (72) and a second pillar (73) extends through the lower arm of the nut (75). The guide spindle (71) is held parallel to the extension (70), and a distal end of the extension (70) is supported by a bearing block formed on top of the first pillar (72).

On a light input side of the optical switch there is provided a first collimating lens (80) attached to one end of an optical fiber (82), the first collimating lens (80) being secured in the upper arm (74) of the nut (75).

On a light output side, the optical switch comprises a group of second collimating lenses (81) attached to the ends of optical fibers (not shown), one second collimating lens (81) to each optical fiber. As shown, the second collimating lenses (81) are disposed in a side-by-side straight line relationship.

Figure 9:
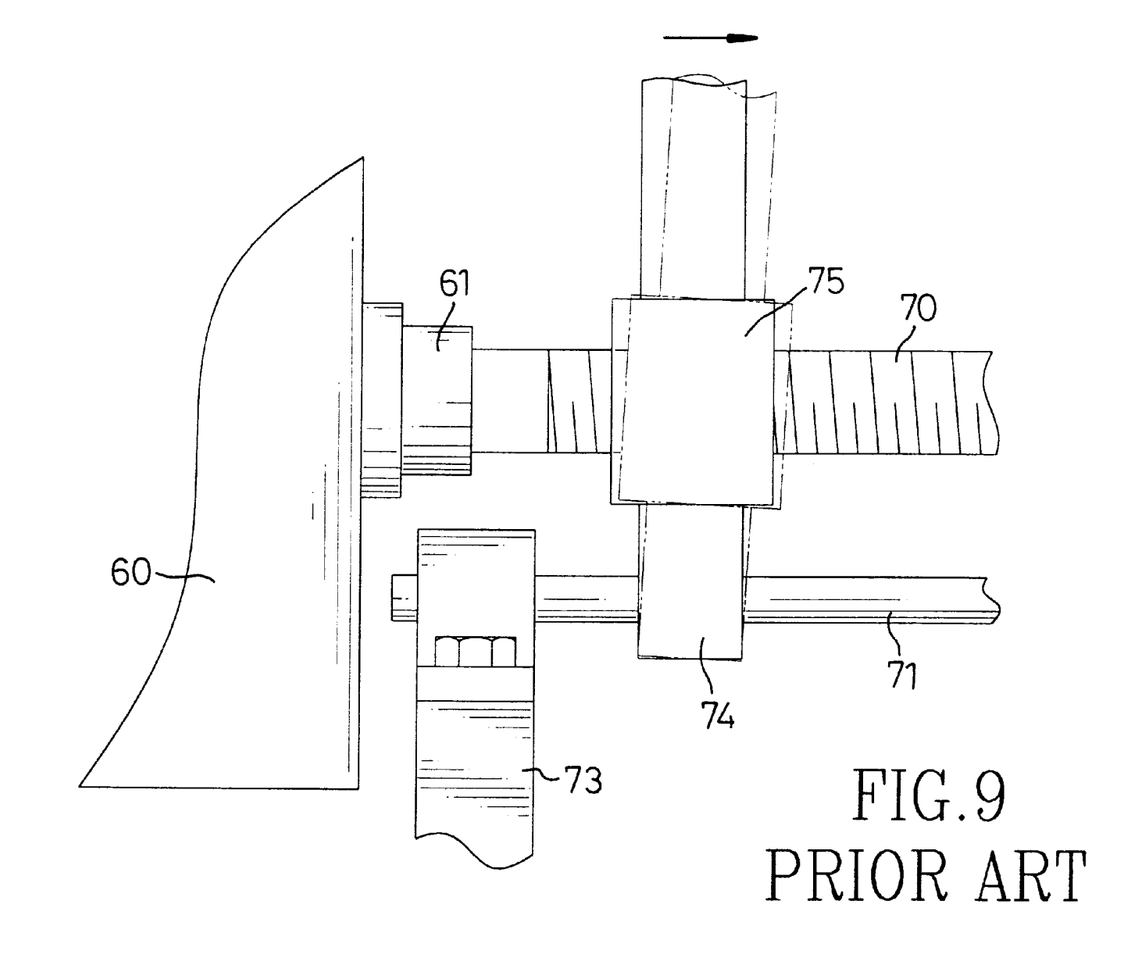
FIG. 9 is a schematic view of the conventional optical switch, wherein a mounting plate of the conventional optical switch is inclined.

In accordance with the foregoing description, when the motor (60) drives the threaded axial extension (70) to rotate, the upper arm (74) is linearly moved along the threaded axial extension (70) so that the first collimating lens (80) is sequentially moved to align with the second collimating lenses (81). However, only one fulcrum is defined between the upper arm (74) and the guide spindle (71), thus the upper arm (74) easily inclines out of alignment (as shown in FIG. 9) and the first collimating lens (80) is consequently mis-aligned with the second collimating lenses (81). Due to the mis-alignment of first collimating lens (80) and the second collimating lenses (81), the light signal transmission has a significant loss, and thus a serious error occurs in the optical fiber inspection procedure.

The optical switch has a further disadvantage which is: The upper arm (74) is only supported by the guide spindle (71) and thus easily inclines, hence assembly of the optical switch requires special care to ensure that the optical switch will operate precisely.

To overcome the shortcomings, the present invention provides an optical fiber switching device to mitigate and obviate the aforementioned problems.

SUMMARY OF THE INVENTION

The main objective of the invention is to provide an optical fiber switching device to precisely align a light input side with a light output side so as to increase the accuracy of an optical fiber inspection process.

The second objective of the invention tends to provide an optical fiber switching device having a small quantity of components so as to enable easy assembly of the optical fiber switching device.

Other objects, advantages and novel features of the invention will become more apparent from the following detailed description when taken in conjunction with the accompanying drawings.

DETAILED DESCRIPTION OF THE PREFERRED EMBODIMENT

Figure 1:
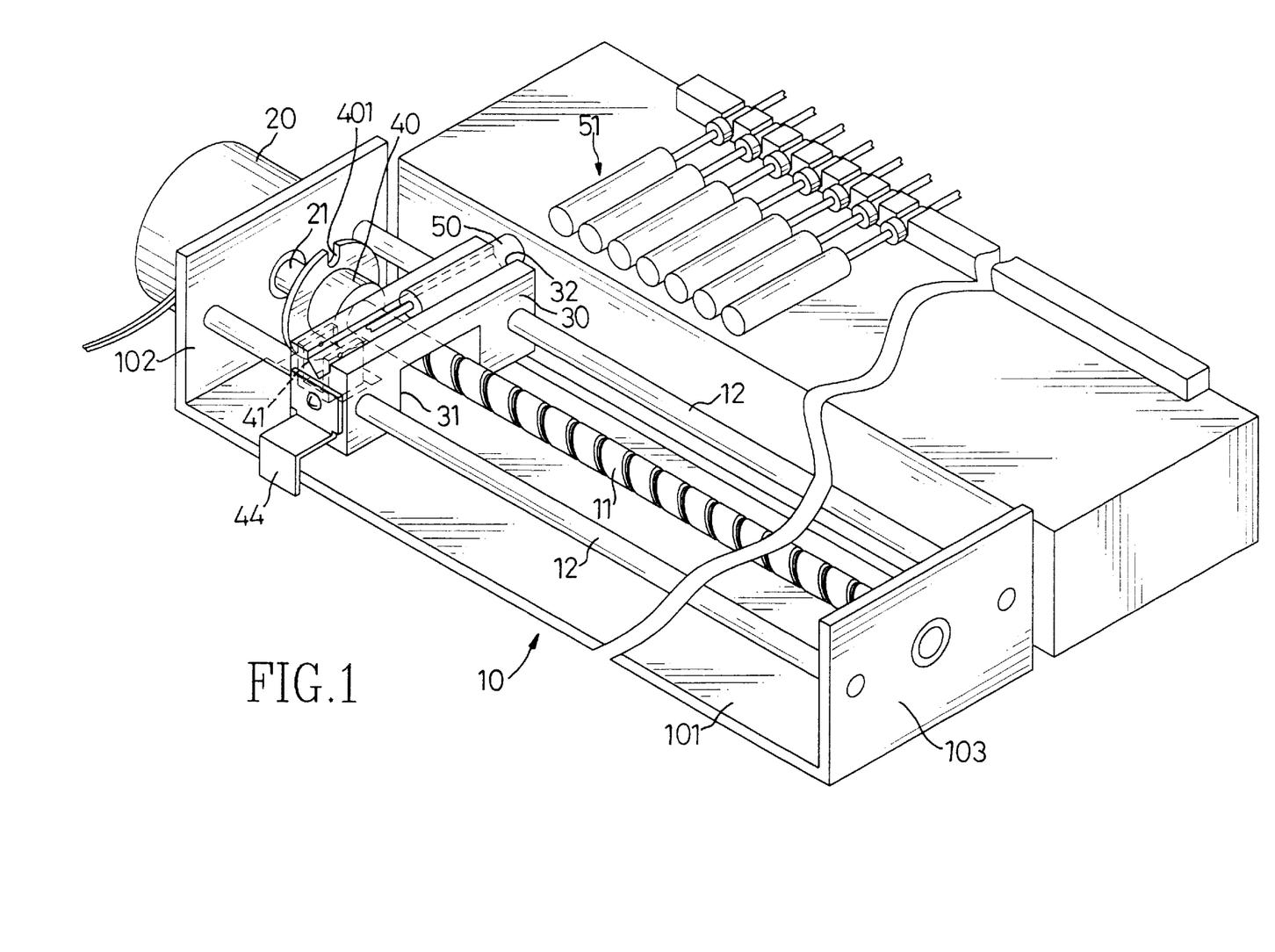
FIG. 1 is a perspective view of a first embodiment of an optical fiber switching device in accordance with the present invention.

With regards to FIG. 1, an optical fiber switching device mainly comprises a holding base (10), a motor (20), a threaded axle (11), two guide spindles (12) and a positioning block (30).

The holding base (10) is composed of a bottom plate (101), a first plate (102) and a second plate (103) respectively and perpendicularly formed on two opposite edges of the bottom plate (101), thus the holding base (10) is substantially U-shaped.

The motor (20) having a shaft (21) extends through a hole defined in the first plate (102) to connect with a first end of the threaded axle (11). A second end of the threaded axle (11) is rotably connected with the second plate (103).

The two guide spindles (12) held parallel to the threaded axle (11) are securely connected between the first plate (102) and the second plate (103).

The positioning block (30) is situated at the bottom plate (101) near the motor (20). The positioning block (30) is defined with a slot (31) to allow the threaded axle (11) to extend therethrough. A plank (311) is formed at a top surface defining the slot (31) (shown in FIG. 3) to mesh with the thread of the threaded axle (11), so that the positioning block (30) is moved along the threaded axle (11). The positioning block (30) is further defined with two holes to allow the two guide spindles (12) to respectively extend therethrough, thus the positioning block (30) is slidably and linearly moved along the two guide spindles (12). The top surface of the positioning block (30) is defined with a recess (32) for receiving an first collimating lens (50).

Multiple second collimating lenses (51) are sequentially positioned at one side of the optical fiber switching device with an interval to correspond to the first collimating lens (50) so that each of the multiple second collimating lenses (51) sequentially receives the light signal from the first collimating lens (50).

Figures 2, 3:
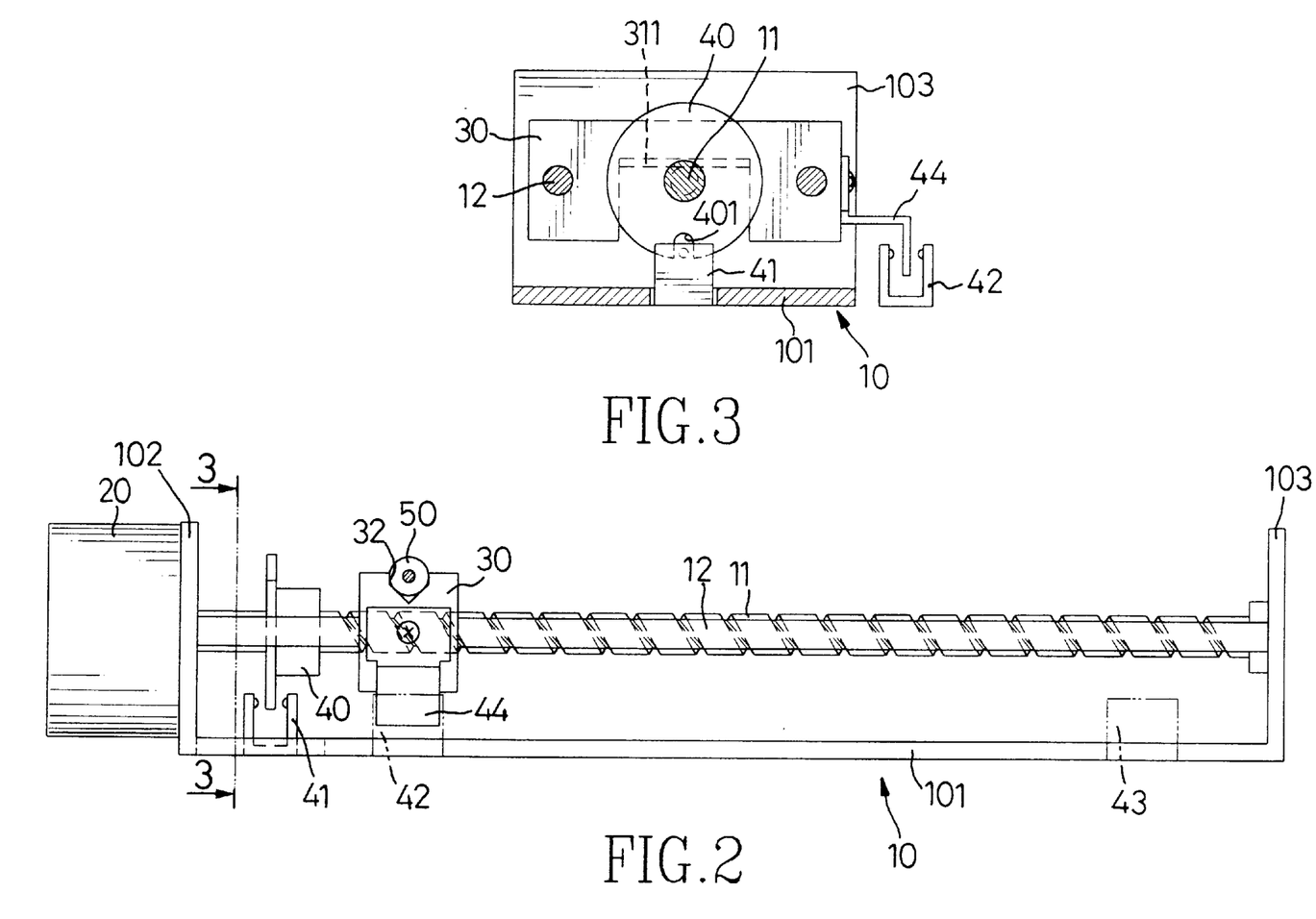
FIG. 2 is a side-plan view of the first embodiment of the optical fiber switching device in accordance with the present invention.
FIG. 3 is a cross-section view taken from line 3—3 in FIG. 2 of the first embodiment of the optical fiber switching device in accordance with the present invention.
Figure 4:
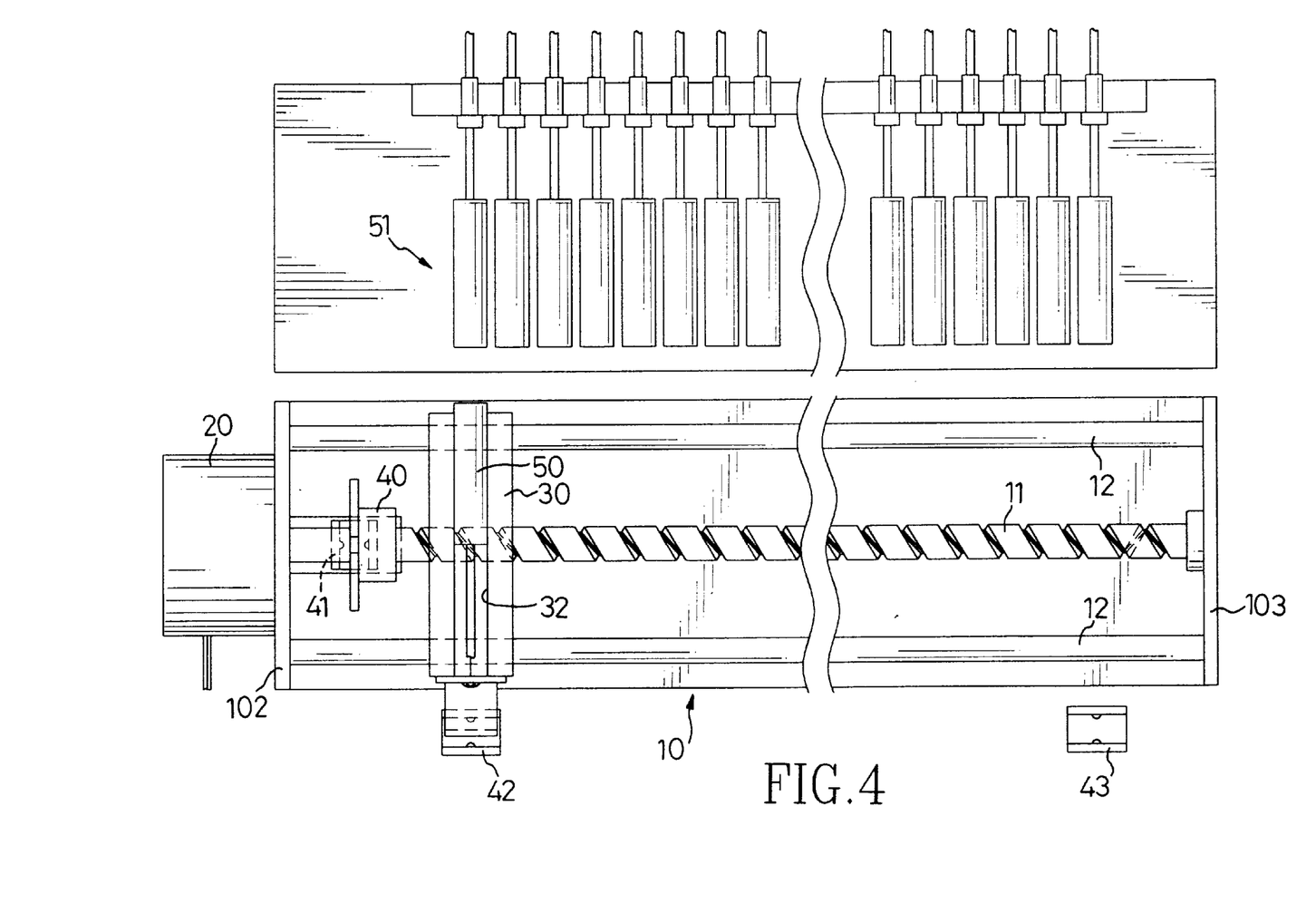
FIG. 4 is a top plan view of the first embodiment of the optical fiber switching device in accordance with the present invention.

With regards to FIGS. 3 and 4, when the motor (20) is actuated, the shaft (21) drives the threaded axle (11) to rotate, and thus the positioning block (30) is linearly moved along the threaded axle (11) since the plank (311) is meshed with the threaded axle (11). Furthermore, the positioning block (30) is simultaneously supported by the two guide spindles (12), thus the positioning block (30) is kept in a balanced status.

With reference to FIGS. 2, 3 and 4, in order to align the positioning block (30) at a precise beginning point of the movement, i.e. the position of the first one of the multiple second collimating lenses (51), a first optical sensor (42) and a third optical sensor (41) are provided to set the beginning point. The first optical sensor (42) is positioned at the side opposite to the multiple second collimating lenses (51) and in alignment with the first one of the multiple second collimating lenses (51). The positioning block (30) is further attached with a shading plate (44) to correspond to the first optical sensor (42), wherein the shading plate (44) is used to obstruct the light signal of the first optical sensor (42) when the positioning block (30) passes by the first optical sensor (42).

A rotating disk (40) defined with a notch (401) on the periphery thereof and the third optical sensor (41) are used to assist the positioning block (30) being moved at the precise beginning point. The rotating disk (40) is rotatably received on the shaft (21) of the motor (20), and is positioned between the first plate (102) and the positioning block (30). The third optical sensor (41) is disposed under the rotating disk (40), wherein the third optical sensor (4 1) is actuated by the rotating disk (40).

When the positioning block (30) is moving from the second plate (103) toward the motor (20) to obstruct the light signal of the first optical sensor (42) by the shading plate (44), the rotating disk (40) is still rotating until the third optical sensor (41) been actuated. When the notch (401) is aligned with the third optical sensor (41), the light signal of the third optical sensor (40) passes through the notch (401), whereby the positioning, block (30) immediately stops at the beginning point and the first collimating lens (50) is aligned with the first one of the multiple second collimating lenses (51). According to foregoing description, the beginning point of movement is precisely obtained by using the first optical sensor (42) and the third optical sensor (41).

In order to avoid the positioning block (30) colliding with the second plate (103) in linear movement, a second optical sensor (43) is disposed at the side opposite to the multiple second collimating lenses (51) and remote from the motor (20) to function as an ending point. When the shading plate (44) passes by the second optical sensor (43), the light signal of the second optical sensor (43) is obstructed, whereby the positioning block (30) immediately stops moving. According to the foregoing description, the first and the second optical sensors (42, 43) are respectively used as a beginning position and an ending position of the movement of the positioning block (30).

Figure 5:
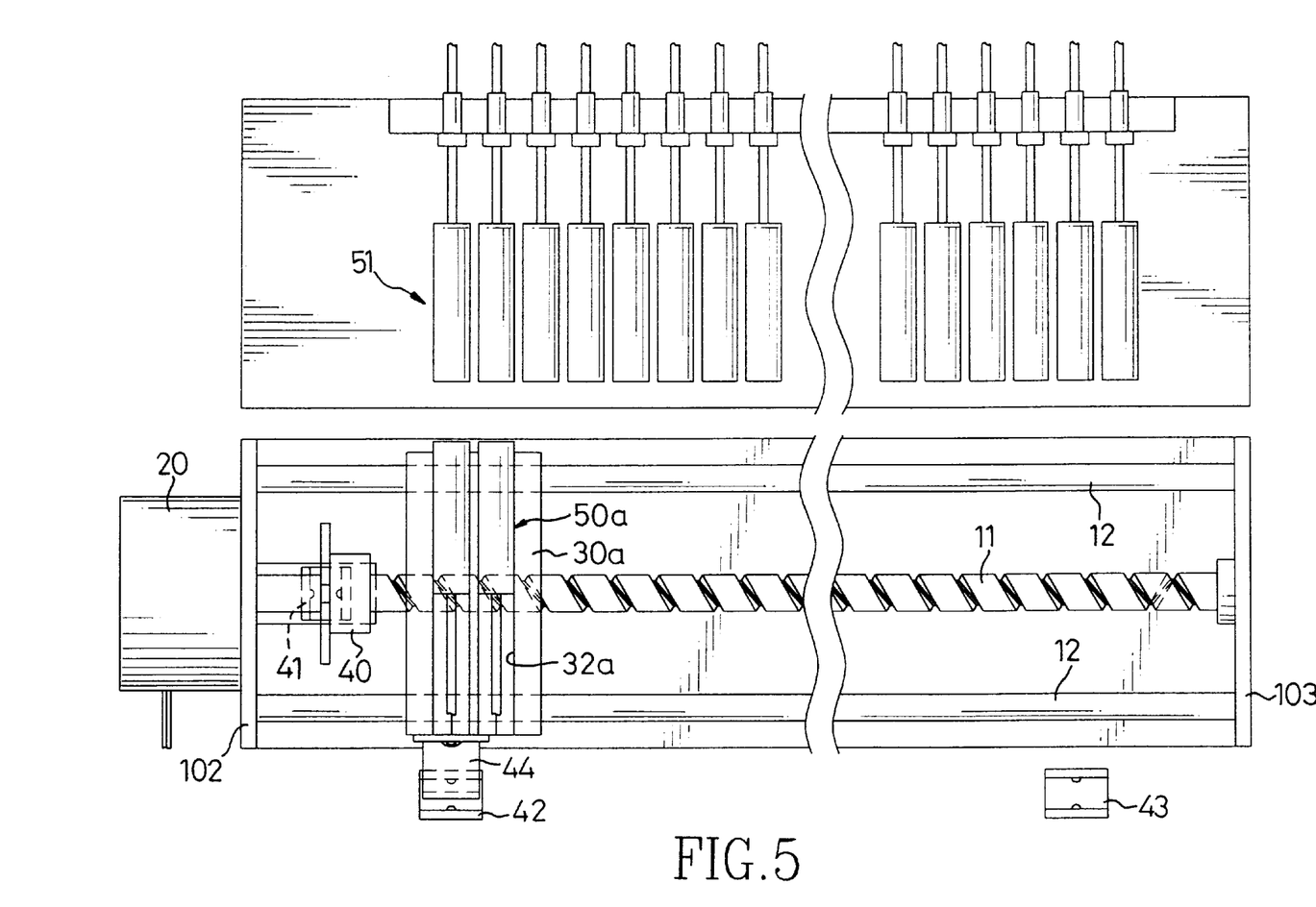
FIG. 5 is a top plan view of a second embodiment of the optical fiber switching device in accordance with the present invention.

With reference to FIG. 5, the second embodiment of the optical fiber switching fiber is basically the same as the first embodiment of the optical fiber switching fiber, wherein the difference is that the positioning block (30a) is defined with two recesses (32a) to receive two first collimating lenses (50a). The interval between the two first collimating lenses (50a) corresponds to the interval between two adjacent multiple second collimating lenses (51a).

Figure 6:
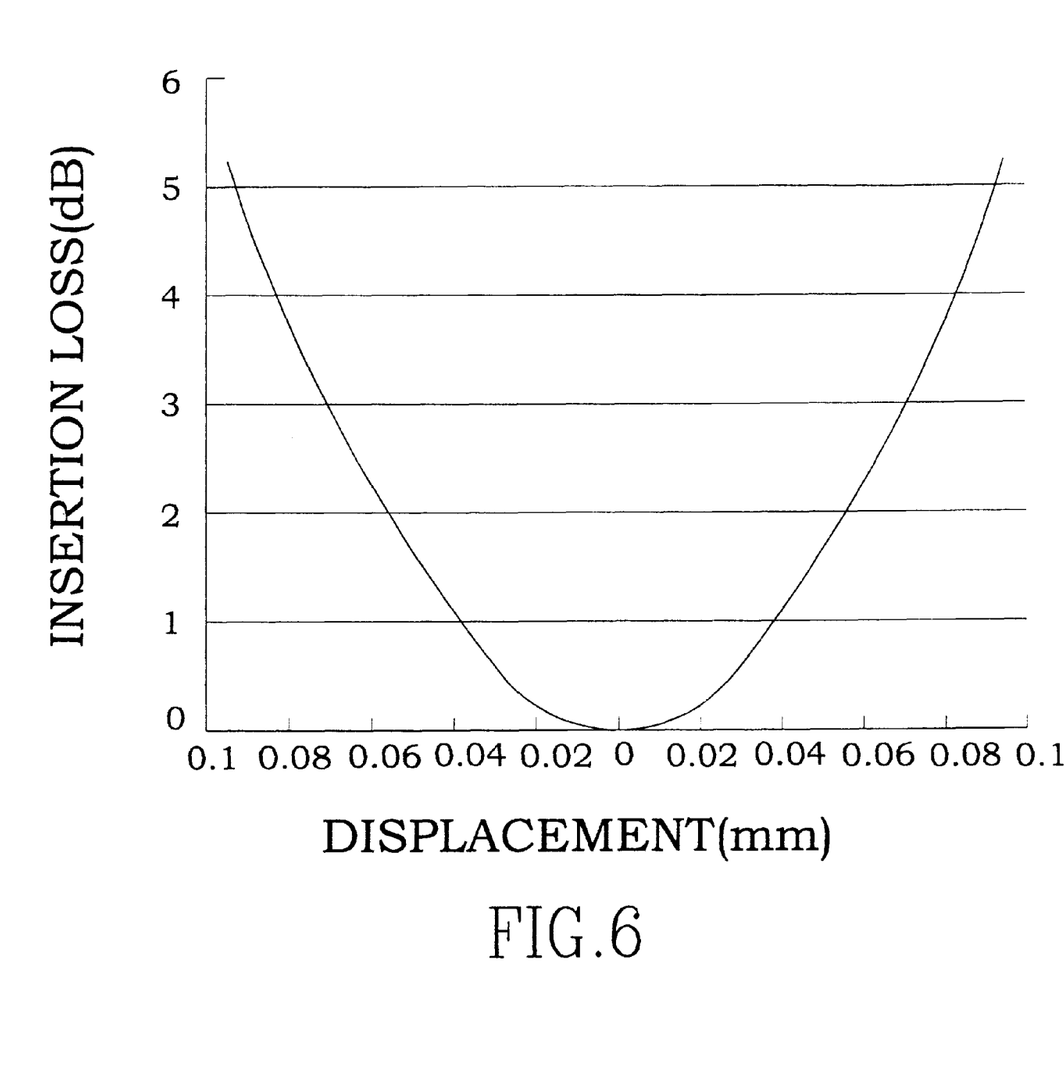
FIG. 6 is a graph of insertion loss versus displacement between a light output side and a light input side.
Figure 7:
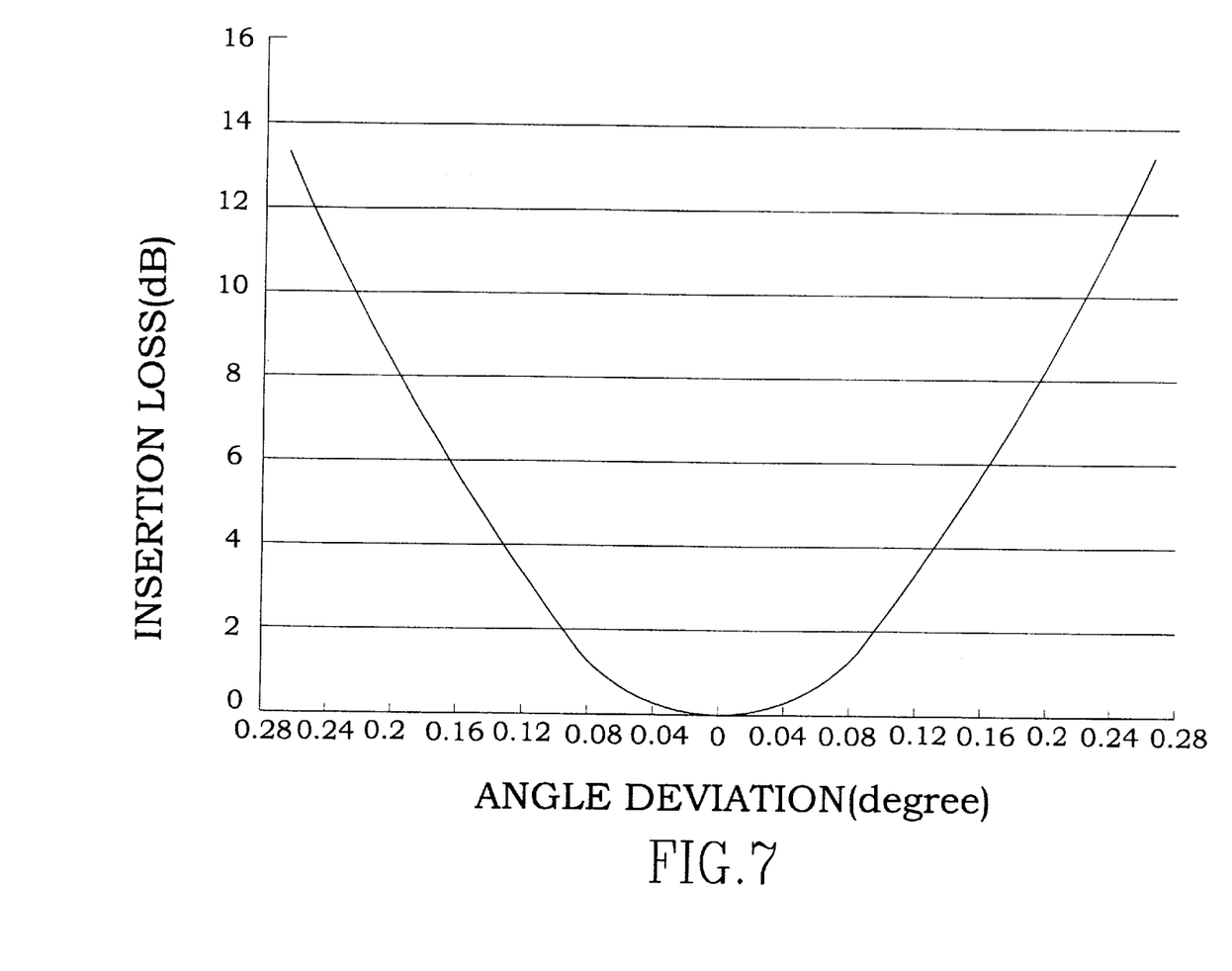
FIG. 7 is a graph of insertion loss versus angle deviation between a light output side and a light input side.

With reference to FIGS. 6 and 7, if a displacement exists between the first collimating lens (50) and the second collimating lenses (51), the light signal received by the second collimating lens (51) has a great loss. Similarly, if an angle deviation exists between the first optical collimating lens (50) and the second collimating lens (50), the light signal also has a great loss. When the light signal has the loss, the accuracy of checking if the optical fiber is damaged is greatly reduced.

From the foregoing description, the optical fiber switching device in accordance with the present invention has the following several advantages:

1. The light output side is precisely aligned with the light input side, because the positioning block on which the first collimating lenses are disposed is simultaneously supported by the threaded axle and two guide spindles, thus the positioning block is moved in balance.

2. The components of the optical fiber switching device are simple, because the threaded axle, two guide spindles and the positioning block are installed in the holding base, thus the amount of components is low. Furthermore, the fabrication cost is also low.

Although the present invention has been explained in relation to its preferred embodiment, it is to be understood that many other possible modifications and variations can be made without departing from the spirit and scope of the invention as hereinafter claimed.

What is claimed is:

1. An optical fiber switching device comprising:

a U-shaped holding base composed of a bottom plate, a first plate and a second plate respectively formed at opposite edges of the bottom plate;

a motor fixed to the first plate and connected with a first end of a threaded axle, wherein a second end of the threaded axle is rotatably connected with the second plate, thus when the motor is actuated, the motor drives the threaded axle to rotate;

two guide spindles held parallel to the threaded axle and securely connected between the first plate and the second plate;

a positioning block provided with two holes to correspond to the two guide spindles, wherein the positioning block is meshed with the threaded axle, whereby when the motor drives the threaded axle to rotate, the positioning block is linearly moved along the threaded axle; and at least one first collimating lens disposed on a top surface of the positioning block to correspond to at least one second collimating lens that is disposed at a side of the holding base.

2. The optical fiber switching device as claimed in claim 1, wherein the positioning block further defines a notch in a middle portion of the positioning block, and a plank is formed at a top surface defining the notch to mesh with the threaded axle.

3. The optical fiber switching device as claimed in claim 2, wherein a first optical sensor is disposed at a side opposite to the at least one second collimating lens and in alignment with the at least one second collimating lens, a shading plate is attached on a side of the positioning block to obstruct a light signal of the first optical sensor when the positioning block passes by the first optical sensor.

4. The optical fiber switching device as claimed in claim 3, wherein a second optical sensor is disposed at the side opposite to the at least one second collimating lens and remote from the motor to correspond to the shading plate.

5. The optical fiber switching device as claimed in claim 4, wherein a rotating disk defined with a notch is rotably received on the threaded axle, and positioned between the first plate and the positioning block, and a third optical sensor is disposed under the rotating disk to correspond to the notch.

6. The optical fiber switching device as claimed in claim 1, wherein a first optical sensor is disposed at a side opposite to the at least one second collimating lens and in alignment with the at least one second collimating lens, a shading plate is attached on a side of the positioning block to obstruct a light signal of the first optical sensor when the positioning block passes by the first optical sensor.

7. The optical fiber switching device as claimed in claim 6, wherein a second optical sensor is disposed at the side opposite to the at least one second collimating lens and remote from the motor to correspond to the shading plate.

8. The optical fiber switching device as claimed in claim 7, wherein a rotating disk provided with a notch is rotably received on the threaded axle, and positioned between the first plate and the positioning block, and a third optical sensor is disposed under the rotating disk to correspond to the notch.

* * * * *